(12) United States Patent
Tsubone et al.

(10) Patent No.: US 11,990,045 B2
(45) Date of Patent: May 21, 2024

(54) PERIPHERY RECOGNITION SUPPORT SYSTEM AND METHOD FOR PERSONAL WATERCRAFT

(71) Applicant: KAWASAKI MOTORS, LTD., Akashi (JP)

(72) Inventors: Toshiyuki Tsubone, Kobe (JP); Shuichi Miyanishi, Kobe (JP); Tokishin Nishinaka, Kobe (JP); Nobuyuki Nishiguchi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 278 days.

(21) Appl. No.: 17/372,175

(22) Filed: Jul. 9, 2021

(65) Prior Publication Data

US 2023/0012090 A1    Jan. 12, 2023

(51) Int. Cl.
| | |
|---|---|
| *G08G 3/02* | (2006.01) |
| *B63B 34/10* | (2020.01) |
| *B63B 43/18* | (2006.01) |
| *B63B 49/00* | (2006.01) |
| *G01S 15/93* | (2020.01) |
| *H04W 4/40* | (2018.01) |

(52) U.S. Cl.
CPC ............... *G08G 3/02* (2013.01); *B63B 34/10* (2020.02); *B63B 43/18* (2013.01); *B63B 49/00* (2013.01); *G01S 15/93* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 8,532,624 | B2 * | 9/2013 | Chava | H04Q 9/00 |
| | | | | 235/462.01 |
| 9,185,364 | B1 | 11/2015 | Odierna et al. | |
| 9,984,354 | B1 * | 5/2018 | Chinoy | H04N 23/90 |
| 11,027,797 | B1 | 6/2021 | Uozumi et al. | |
| 2006/0091659 | A1 * | 5/2006 | Matsuda | B60R 21/26 |
| | | | | 280/736 |
| 2015/0275368 | A1 * | 10/2015 | Motoyama | C23C 16/45578 |
| | | | | 118/728 |
| 2017/0129337 | A1 * | 5/2017 | Sano | B60K 35/00 |
| 2019/0065859 | A1 * | 2/2019 | Togashi | G06T 7/215 |
| 2021/0031796 | A1 * | 2/2021 | Hayashida | G05D 1/0044 |
| 2021/0042534 | A1 * | 2/2021 | Hayashida | G06T 7/207 |

(Continued)

FOREIGN PATENT DOCUMENTS

| | | | | | |
|---|---|---|---|---|---|
| CN | 1405578 | A | * | 3/2003 | ............. G01S 13/86 |
| CN | 102473298 | B | * | 8/2015 | ......... G06K 9/00523 |
| CN | 110275465 | A | * | 9/2019 | |

(Continued)

*Primary Examiner* — Fekadeselassie Girma
(74) *Attorney, Agent, or Firm* — Alleman Hall & Tuttle LLP

(57) ABSTRACT

A periphery recognition support system for a personal watercraft includes processing circuitry. The processing circuitry is configured to: receive position related data related to a positional relation between a personal watercraft and a peripheral object around the personal watercraft; determine based on the position related data whether or not a predetermined warning condition is satisfied; and output a predetermined warning signal when it is determined that the warning condition is satisfied.

19 Claims, 11 Drawing Sheets

(56) References Cited

U.S. PATENT DOCUMENTS

| | | | |
|---|---|---|---|
| 2022/0203922 A1* | 6/2022 | Yamazaki | ......... B60R 21/01516 |
| 2023/0012090 A1* | 1/2023 | Tsubone | .................. B63B 34/10 |

FOREIGN PATENT DOCUMENTS

| | | | | |
|---|---|---|---|---|
| DE | 102012107581 A1 * | 5/2014 | ............... | A61G 5/00 |
| JP | 2014139069 A * | 7/2014 | | |
| WO | WO-2021055646 A1 * | 3/2021 | ........... | G01C 21/005 |
| WO | WO-2021132437 A1 * | 7/2021 | ........... | G01S 13/917 |

* cited by examiner

PERIPHERY RECOGNITION SUPPORT SYSTEM AND METHOD FOR PERSONAL WATERCRAFT

BACKGROUND OF THE INVENTION

Field of the Invention

The present disclosure relates to a system and method of supporting periphery recognition of a personal watercraft.

Description of the Related Art

Personal watercrafts (PWC) that travel on water are known. The degree of freedom of a traveling direction of the PWC and the degree of freedom of a traveling route of the PWC are higher than those of a vehicle that travels on land. Therefore, when the PWC and an object (such as a swimmer or another PWC) around the PWC approach each other, the degree of freedom of a relative movement direction between the PWC and the object and the degree of freedom of a relative movement route between the PWC and the object are high.

SUMMARY OF THE INVENTION

A periphery recognition support system for a personal watercraft (PWC) according to one aspect of the present disclosure includes processing circuitry. The processing circuitry is configured to: receive position related data related to a positional relation between the PWC and a peripheral object around the PWC; determine based on the position related data whether or not a predetermined warning condition is satisfied; and output a predetermined warning signal when it is determined that the warning condition is satisfied.

A periphery recognition support method for a personal watercraft (PWC) according to another aspect of the present disclosure includes: receiving position related data by processing circuitry, the position related data indicating a positional relation between the PWC and a peripheral object around the PWC; and making a user interface output information by the processing circuitry, the information indicating the position related data.

A periphery recognition support method for a personal watercraft (PWC) according to yet another aspect of the present disclosure includes: receiving position related data by processing circuitry, the position related data indicating a positional relation between the PWC and a peripheral object around the PWC; determining by the processing circuitry based on the position related data whether or not a predetermined warning condition is satisfied; and outputting a predetermined warning signal by the processing circuitry when the warning condition is satisfied.

DESCRIPTION OF THE PREFERRED EMBODIMENTS

Hereinafter, an embodiment will be described with reference to the drawings.

Figure 1:
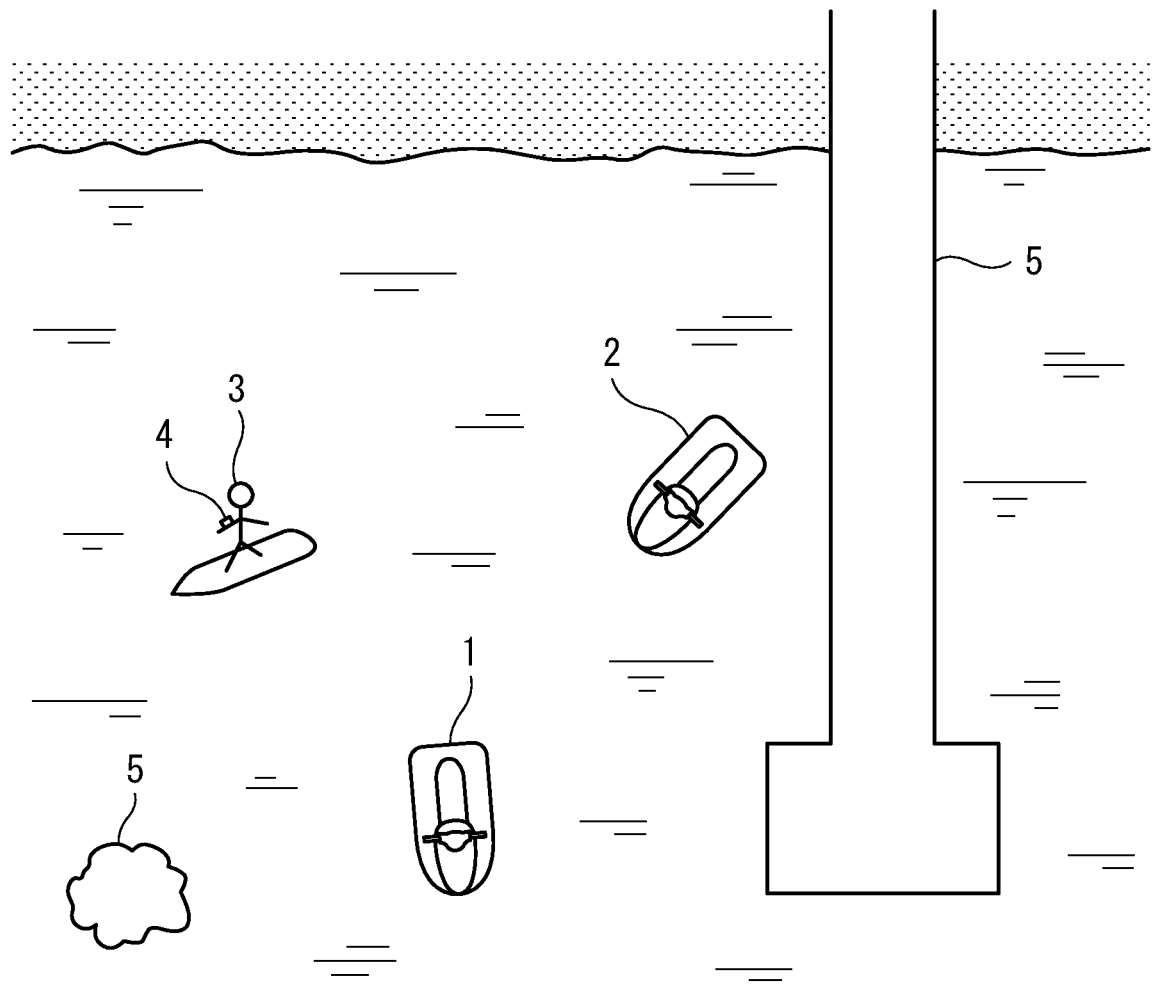
FIG. 1 is a plan view showing a personal watercraft traveling on water and its periphery when viewed from above.

FIG. 1 is a plan view showing a personal watercraft traveling on water and its periphery when viewed from above. In the following description, the personal watercraft may be abbreviated as "PWC." As shown in FIG. 1, on a water surface of a water area W (such as a sea or a lake), a human 3, such as a swimmer who is not riding a PWC, may exist in addition to PWCs 1 and 2. The human 3 may wear a communication terminal 4, such as a smart watch, which is wearable and can perform wireless communication. An on-water obstacle 5, such as a pier, a reef, a shore, a shore protection fence, or a buoy, may exist on the water surface of the water area W. Under the water surface of the water area W, an in-water obstacle that is an unforeseen difficulty, such as the bottom of a shallow place, coral, or a rock, may exist.

A peripheral object may exist around the PWC 1. Examples of the peripheral object may include: moving objects floating on water or in water; and fixed objects that are artificial objects, such as buildings, and non-artificial natural objects, such as rocks. Examples of the peripheral object as the moving object may include swimmers and other PWCs. Examples of the peripheral object as the fixed object may include the on-water obstacles and the in-water obstacles.

Examples of the peripheral object may include not only tangible objects but also intangible objects. Examples of the peripheral object include geographical borders set on a chart. Specifically, examples of the peripheral object may include: a profile line of a regulated area where output regulation is required in a bay or the like; and a boundary line between an entry prohibited area where entry is prohibited and a travelable area. The regulated area and the travelable area may be predetermined as general rules or may be determined as local rules for respective water areas. As above, the peripheral object is a target located around the PWC 1. Regardless of whether the peripheral object is tangible or intangible, the peripheral object may be a target that may influence the movement of the PWC 1.

A rider of the PWC 1 recognizes the peripheral object and operates the PWC 1. Since the PWC 1 travels or floats on water, the degree of freedom of a movement direction of the PWC 1 and the degree of freedom of a movement route of the PWC 1 are higher than those of a vehicle that travels on land. Therefore, the number of directions in which the peripheral objects to be recognized by the rider of the PWC 1 exist tends to be larger than that of the on-land vehicle. Under circumstances, such as thick fog or ocean waves, a visually-confirmable peripheral range may become narrow. Since the PWC 1 travels on water, a braking distance tends to be long. While the PWC 1 is floating except for while the PWC 1 is moored, the PWC 1 moves in any direction by the influence of water flow or wind. Therefore, an area where the rider of the PWC 1 should recognize the peripheral objects while the PWC 1 is traveling or floating tends to be large.

By the influence of the turbulence of the water surface or the influence of the turbidity of water, it may be difficult for the rider of the PWC 1 to recognize the obstacles under the water surface. By the influence of a vertical motion of the PWC 1 by waves or the influence of a vertical motion of the peripheral object by waves, it may be difficult for the rider of the PWC 1 to recognize the obstacle on water. Since the geographical border set on the chart is intangible, it may be difficult for the rider to recognize the geographical border even if the rider sees the water area.

Figure 2:
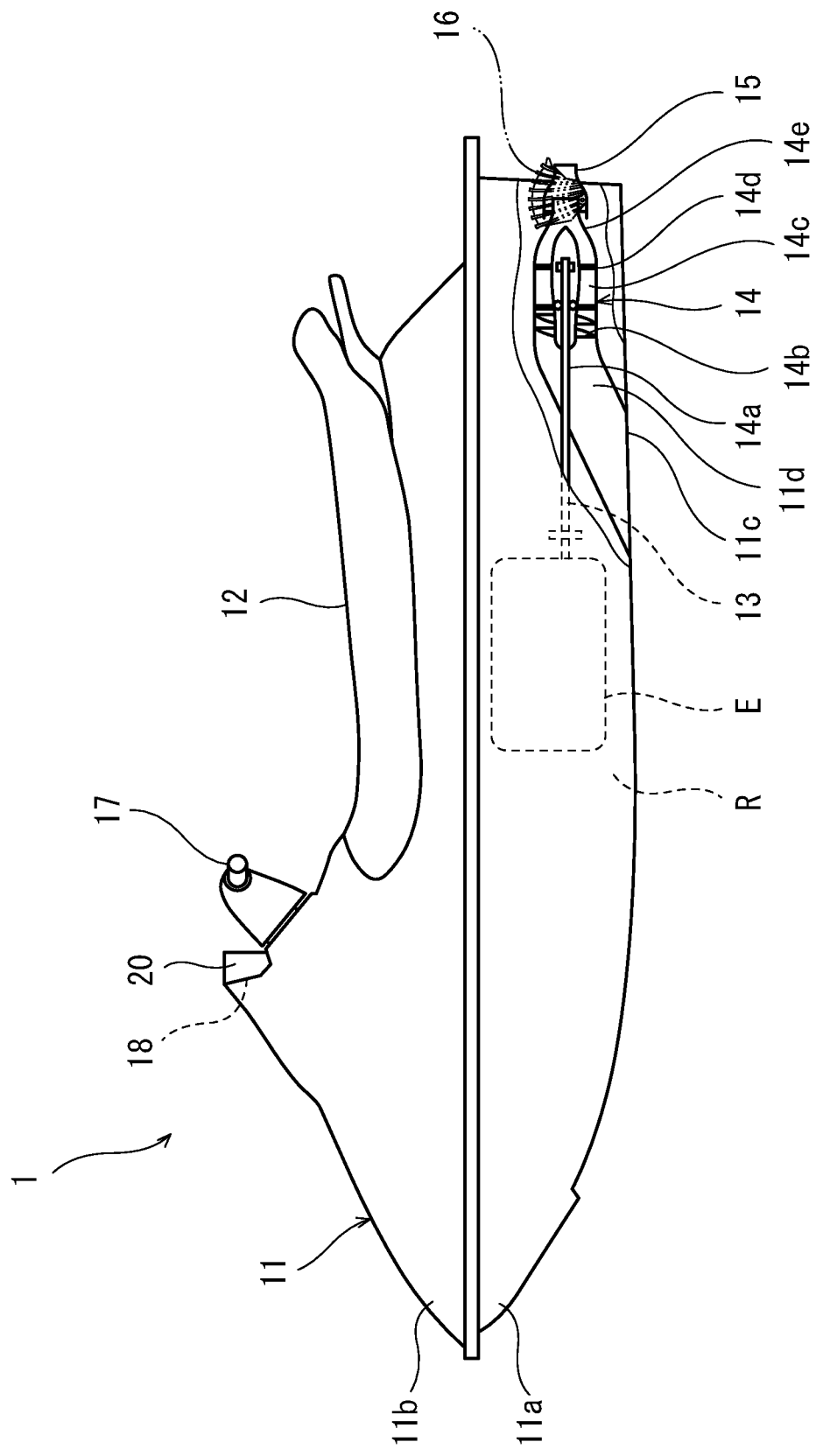
FIG. 2 is a side view of the PWC, a part of which is shown as a sectional view.

FIG. 2 is a side view of the PWC, a part of which is shown as a sectional view. As shown in FIG. 2, the PWC 1 includes a watercraft body 11. The watercraft body 11 includes a hull 11a and a deck 11b. The deck 11b covers the hull 11a from above. A seat 12 on which a user is seated is attached to the deck 11b. A prime mover room R is inside the watercraft body 11. A prime mover E is housed in the prime mover room R of the watercraft body 11. The prime mover E may be an internal combustion engine, an electric motor, or a combination of an internal combustion engine and an electric motor. An output shaft of the prime mover E is connected to a propeller shaft 13 extending rearward.

A water jet pump 14 is arranged at a rear portion of the hull 11a. The water jet pump 14 includes a pump shaft 14a, an impeller 14b, a stationary vane 14c, a pump casing 14d, and a pump nozzle 14e. The pump shaft 14a is coupled to a rear end portion of the propeller shaft 13. The impeller 14b is fixed to the pump shaft 14a. The stationary vane 14c is arranged behind the impeller 14b. The pump casing 14d covers the impeller 14b from an outside in a radial direction. The pump nozzle 14e is directed in a rear direction of the watercraft body 11.

A water intake port 11c is open at a bottom portion of the hull 11a. The water intake port 11c communicates with the pump casing 14d through a water intake passage 11d. A steering nozzle 15 is connected to the pump nozzle 14e of the water jet pump 14 so as to be swingable to left and right. A reverse bucket 16 is attached to the hull 11a. The reverse bucket 16 is pivotally supported by the hull 11a so as to be turnable between an advance position at which the reverse bucket 16 covers an ejection port of the steering nozzle 15 from behind to reverse ejected water from the steering nozzle 15 toward a front direction and a retreat position at which the ejection port of the steering nozzle 15 opens toward the rear direction. When the reverse bucket 16 moves to the advance position, and the PWC 1 moves rearward. When the reverse bucket 16 moves to the advance position, and the steering nozzle 15 swings to the left or the right, the PWC 1 moves diagonally rearward. To be specific, the PWC 1 may move in any direction.

The PWC 1 pressurizes and accelerates the water, taken in through the water intake port 11c of the bottom portion of the hull 11a, by rotational force of the impeller 14b of the water jet pump 14 driven by the prime mover E. The flow of this water is straightened by the stationary vane 14c and is ejected rearward from the pump nozzle 14e through the steering nozzle 15. Thus, propulsive force is generated. The PWC is not limited to a watercraft that is propelled on water by jet water flow generated by the water jet pump. The PWC may be a boat that is propelled on water by the rotation of a propeller.

A bar-shaped handle 17 supported by the deck 11b so as to be turnable is arranged at an upper side of a front portion of the deck 11b. When the rider of the PWC 1 tilts the handle 17 to the left or the right, the steering nozzle 15 swings to the left or the right in accordance with the tilting. An operation amount of the handle 17 or the steering nozzle 15, i.e., a steering angle of the handle 17 or the steering nozzle 15 may be detected by a steering angle sensor.

In the present embodiment, the PWC 1 includes a periphery recognition support unit 20 that serves as at least a part of a periphery recognition support system 100. For example, the periphery recognition support unit 20 is located in front of the seat 12. More specifically, the periphery recognition support unit 20 is detachably attached to a unit support 18 of the PWC 1. For example, the unit support 18 is arranged in front of the handle 17, outside a movable range of the handle 17, and above an upper surface of the seat 12. Each of other PWCs, such as the PWC 2, has the same configuration as the PWC 1 and includes the periphery recognition support unit 20.

Figure 3:
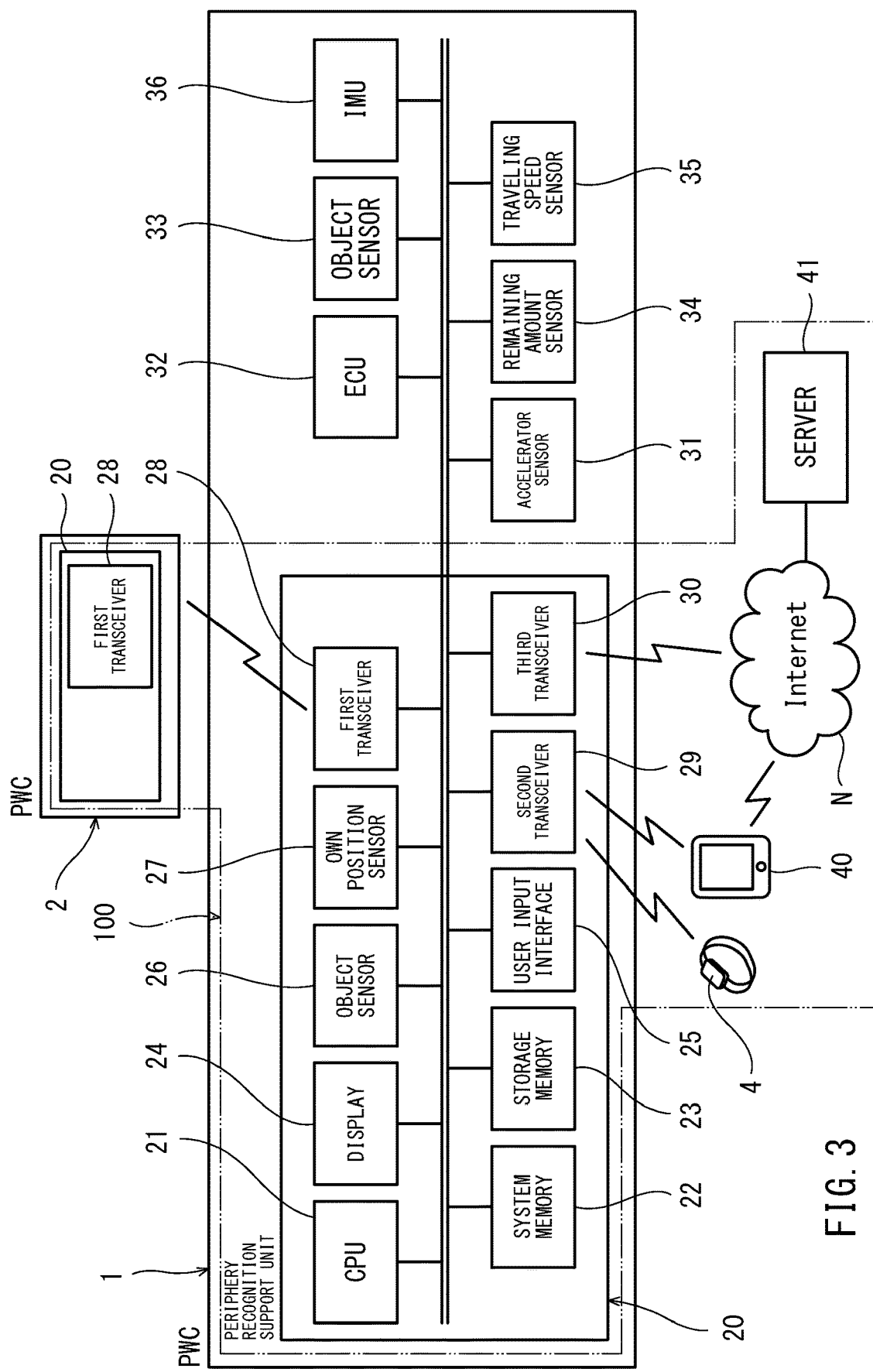
FIG. 3 is a block diagram of a periphery recognition support system.

FIG. 3 is a block diagram of the periphery recognition support system 100. As shown in FIG. 3, the periphery recognition support system 100 includes the periphery recognition support unit 20. The periphery recognition support unit 20 includes: at least one memory that stores a periphery recognition support program; and at least one processor that can execute the periphery recognition support program. Specifically, the periphery recognition support unit 20 includes a CPU 21, a system memory 22, a storage memory 23, a display 24, a user input interface 25, an object sensor 26, an own position sensor 27, a first transceiver 28, a second transceiver 29, a third transceiver 30, and the like.

The CPU 21 is a central processing unit. The system memory 22 may include a RAM. The storage memory 23 may include a ROM. The ROM stores identification information of the PWC 1. The storage memory 23 may include a hard disk, a flash memory, or a combination thereof. The storage memory 23 stores the periphery recognition support program. A configuration in which the CPU 21 executes the periphery recognition support program read by the system memory 22 is one example of processing circuitry.

The display 24 is a type of user output interface. The display 24 may be a display device, such as a liquid crystal display, an organic EL display, an AR (Augmented Reality) display, or a head mount display, which displays a warning image for the rider. The user output interface may be a speaker that outputs warning sound for the rider. The user input interface 25 is an interface through which information manipulated by a user is input to the CPU 21. The user input interface 25 may be a touch panel of the display 24 or may be a manipulation element, such as a button or a lever, which is arranged separately from the display. The user input interface may be a microphone by which information pronounced by the user is input to the CPU 21.

The object sensor 26 is a sensor that acquires position related data related to a positional relation between the PWC 1 and the peripheral object around the PWC 1. The object sensor 26 may detect the peripheral object on the water surface. When the peripheral object is the tangible object, the object sensor 26 may be a sensor that detects the peripheral object by an electromagnetic wave, a sound wave, light, or any combination thereof. The object sensor 26 may be a sonar, a radar sensor, a camera, an infrared sensor, or a RFID sensor.

For example, the sonar may detect a distance from the PWC 1 to a water bottom (for example, a seabed) and a direction of the water bottom by receiving a reflected wave that is the sound wave output downward to the water bottom and then reflected by the water bottom. The radar sensor may detect a distance from the PWC 1 to the peripheral object and a direction of the peripheral object by receiving a reflected radio wave that is an output radio wave reflected by the peripheral object. The camera may detect the distance from the PWC 1 to the peripheral object and the direction of the peripheral object by taking an image of the periphery of the PWC 1 and recognizing the peripheral object in an image by image processing. The infrared sensor may detect the distance from the PWC 1 to the peripheral object and the direction of the peripheral object by detecting a human by a temperature. The RFID sensor may detect the presence of a human in a predetermined range by detecting a RFID tag carried by a human by RFID communication.

The own position sensor 27 is a sensor that detects current position coordinates of the PWC 1. The own position sensor 27 may be a satellite positioning sensor, such as a GPS sensor. The current position coordinates of the PWC 1 may be obtained by calculation based on a movement distance calculated from a traveling speed detected by a below-described traveling speed sensor 35 and a movement direction calculated from acceleration detected by a below-described IMU 36.

The first transceiver 28 performs wireless communication directly with the first transceivers 28 of the periphery recognition support units 20 mounted on the other PWCs, such as the PWC 2, the communication terminal 4 of a swimmer 3, and communication devices similar to those, without through a base station. The first transceiver 28 may perform wireless communication by, for example, RF (Radio Frequency) communication. A frequency band of the wireless communication performed by the first transceiver 27 may be, for example, 20 kHz or more and 300 GHz or less.

The first transceiver 28 may perform communication in accordance with a standard defined by MURS (Multi-Use Radio Service). The first transceiver 28 may have power restriction of two watts and transmit and receive a radio wave in a narrow selected range of a VHF band. The first transceiver 28 can transmit and receive the radio wave to and from the first transceivers 28 corresponding to the similar communication standard to realize bidirectional wireless communication. For example, the first transceiver 28 may modulate rider voice information collected by a microphone of the first transceiver 28, give the modulated information to the propagated radio wave, and transmit the radio wave through an antenna to a periphery. The first transceiver 28 may output, from a speaker thereof, voice information obtained by demodulating the propagated radio wave received from the antenna. With this, two PWCs within a VHF radio wave reception range can perform bidirectional voice call.

The first transceiver 28 may perform bidirectional communication by modulating and demodulating information other than voice. The first transceiver 28 can give position information, detected by the own position sensor 27, to the propagated radio wave and transmit the propagated radio wave to the PWC 2. In other words, the CPU 21 of the periphery recognition support unit 20 can acquire the position information of the PWC 2 through the first transceiver 28. The first transceiver 28 may give the identification information, set for the individual periphery recognition support unit 20, to the propagated radio wave and transmit the radio wave to the PWC 2.

A radio wave transmission/reception range between the first transceivers 28 is set larger than a radio wave transmission/reception range between the below-described second transceivers 29. For example, the radio wave transmission/reception range between the first transceivers 28 may be set to one mile or less.

A wireless communication range of the first transceiver 28 is one example, and the other communication standards and the other communication frequencies may be used. To be specific, a transceiver of an own watercraft and a transceiver of another watercraft may perform bidirectional transmission/reception in accordance with a common communication system.

The second transceiver 29 performs wireless communication directly with mobile information terminals 40, such as smartphones and smart watches, without through the base station. The second transceiver 29 may perform wireless communication with the mobile information terminals 40 by a near field communication standard, such as Bluetooth or Wi-Fi. A radio wave transmission/reception range of the second transceiver 29 is set to, for example, less than 10 meters. The second transceiver 29 performs radio wave transmission and reception with the mobile information terminal 40, and with this, can determine that the mobile information terminal 40 exists within the radio wave transmission/reception range. The mobile information terminal 40 includes a processor and a memory. The mobile information terminal 40 is disposed at the PWC 1 or carried by the rider of the PWC 1 so as to move together with the PWC 1. The mobile information terminal 40 is wirelessly connected to a public line network N, such as the Internet, through the base station on land and can communicate with a server 41. The server 41 includes a processor and a memory.

The third transceiver 30 is wirelessly connected to the network N, such as the Internet, through a base station antenna as a fixed facility and a public line and can communicate with the server 41. To be specific, the periphery recognition support unit 20 may be connected to the network N through the mobile information terminal 40 or may be directly connected to the network N by the third transceiver 30. The third transceiver 30 may be formed so as to be able to perform radio wave transmission and reception with an artificial satellite. With this, even when the periphery recognition support unit 20 is located outside of a radio wave transmission/reception range of a base station antenna on land, the third transceiver 30 can be connected to the network N.

The second transceiver 29 and the third transceiver 30 may be omitted, and the first transceiver 28 may perform communication. The first transceiver 28 and the third transceiver 30 may be omitted, and the second transceiver 29 may perform communication. The first transceiver 28 and the second transceiver 29 may be omitted, and the third transceiver 30 may perform communication.

In addition to the periphery recognition support unit 20, the PWC 1 includes an accelerator sensor 31, an ECU (Electronic Control Unit) 32, an object sensor 33, a remaining amount sensor 34, the traveling speed sensor 35, the IMU 36, and the like. The accelerator sensor 31 detects a required acceleration amount of the rider of the PWC 1. The accelerator sensor 31 detects, for example, an operation amount of an accelerator lever attached to the handle 17. The ECU 32 is a prime mover controller that controls the prime mover E in accordance with the detected value of the accelerator sensor 31. The ECU 32 includes a processor and a memory. The accelerator sensor 31, the ECU 32, the object sensor 33, the remaining amount sensor 34, the traveling speed sensor 35, the IMU 36, and the like are connected to each other through a CAN (Controller Area Network) communication line, and the periphery recognition support unit 20 is connected to the CAN communication line. The periphery recognition support unit 20 may be attachable to and detachable from the unit support 18, and the PWC 1 may include a communication connecting terminal by which the periphery recognition support unit 20 and the ECU 32 are electrically connected to each other, a power supply connecting terminal by which electric power is supplied to the periphery recognition support unit 20, or a combination thereof. The communication connecting terminal and the power supply communication terminal may be integrated with each other.

The object sensor 33 is a sensor that acquires the position related data related to the positional relation between the PWC 1 and the peripheral object around the PWC 1. The object sensor 33 may detect the peripheral object under or on the water surface. The object sensor 33 may be a sensor that detects the peripheral object by an electromagnetic wave, a sound wave, light, or any combination thereof when the peripheral object is the tangible object. Details of the object sensor 33 are similar to the details of the above-described object sensor 26. One of the object sensor 26 and the object sensor 33 may be omitted.

The remaining amount sensor 34 detects a remaining amount of an energy source of the PWC 1. When the prime mover E is an internal combustion engine, the remaining amount sensor 34 detects a fuel remaining amount. When the prime mover E is an electric motor, the remaining amount sensor 34 detects a battery remaining amount. The traveling speed sensor 35 detects the traveling speed of the PWC 1. The IMU 36 is an inertial measurement unit. The IMU 36 includes a triaxial gyro and a three-direction accelerometer and detects a three-dimensional angular speed and a three-dimensional acceleration. In other words, the IMU 36 detects angular speeds around three axes orthogonal to each other in the PWC 1 and accelerations in directions along the three axes.

Figure 4:
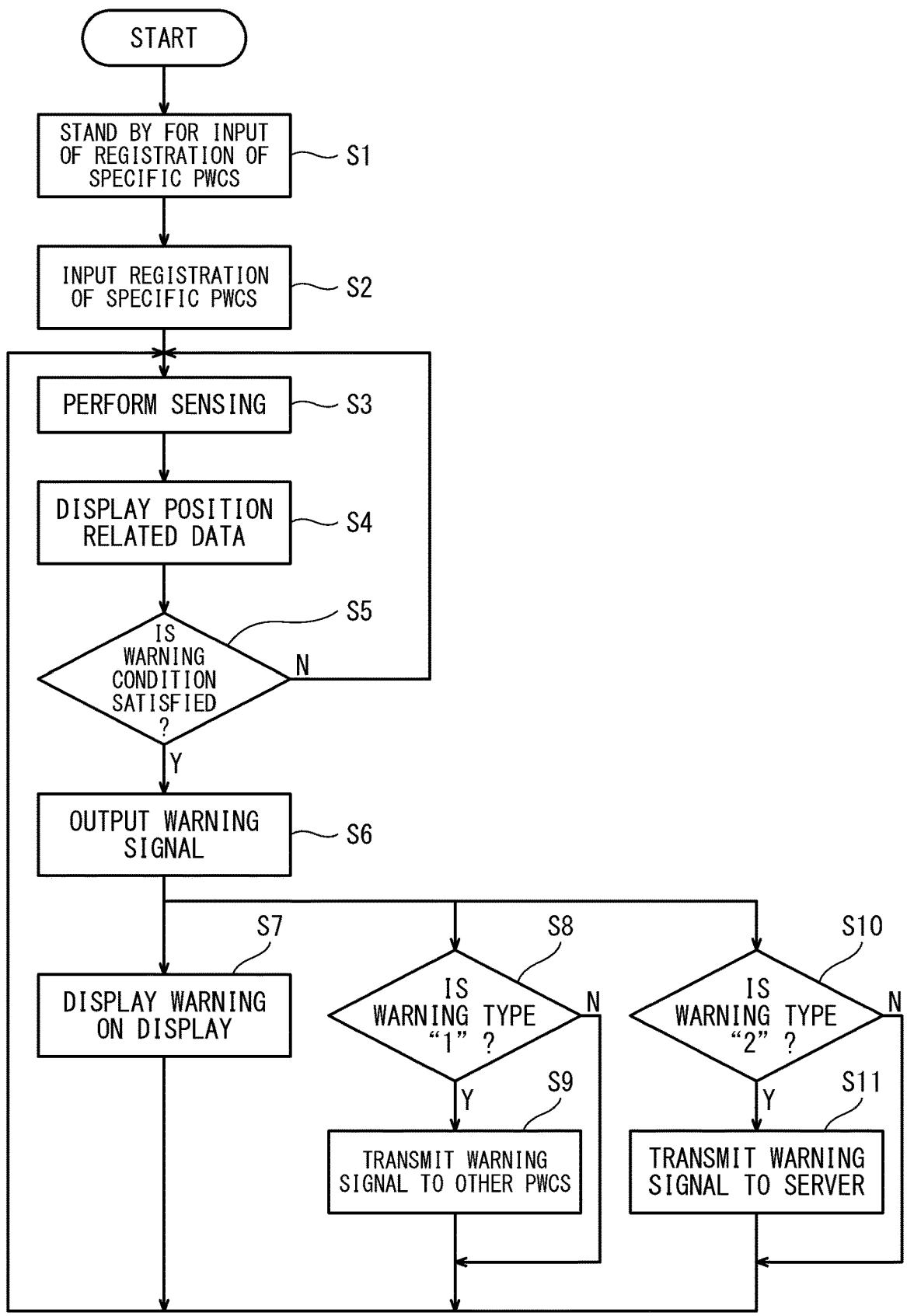
FIG. 4 is a flow chart showing main processing performed by the periphery recognition support system shown in FIG. 3.

FIG. 4 is a flow chart showing main processing performed by the periphery recognition support system 100 shown in FIG. 3. In the periphery recognition support system 100, mainly, the CPU 21 executes commands of the periphery recognition support program in the periphery recognition support unit 20 to perform the following processing. The following will be described based on the flow of FIG. 4 with suitable reference to FIG. 3 and the like.

As shown in FIG. 4, the CPU 21 displays a user input screen image on the display 24 in accordance with a predetermined input manipulation and stands by for a user's input of registering one or more other PWCs as specific PWCs (Step S1). The user manipulates the user input interface 25 of the periphery recognition support unit 20 to input the registration of the specific PWC (Step S2). The CPU 21 stores information of the registered specific PWC in the storage memory 23. Steps S1 and S2 may be executed at any timings requested by the user. Steps S1 and S2 may be omitted.

The registration of the specific PWC may be realized by bidirectional transmission/reception between the first transceivers 28. The CPU 21 may receive information, such as position information, a proceeding direction, and a movement speed of the PWC 2, together with the identification information of the PWC 2 through the first transceiver 28. For example, in Step S1, the CPU 21 may display on the display 24 the position information of the PWC 2 acquired through the first transceiver 28. The user of the PWC 1 determines based on the position and identification information of the PWC 2 displayed on the display 24 whether or not the PWC 2 should be registered. The user of the PWC 1 refers to the display 24, selects the PWC 2 to be registered through the user input interface 25, and instructs the CPU 21. The CPU 21 stores in the storage memory 23 the identification information indicating the PWC 2 selected by the user, as the identification information indicating the PWC to be specified.

Regarding Steps S1 and S2, the periphery recognition support unit 20 may receive the user's input such that the specific PWCs can be registered by being divided into groups, and may store the specific PWCs in the storage memory 23 by associating the specific PWCs with the corresponding groups. The periphery recognition support unit 20 may receive the user's input such that the specific PWCs can be registered by being divided into levels, and may store the specific PWCs in the storage memory 23 by associating the specific PWCs with the corresponding levels. When the CPU 21 displays the user input screen image on the display 24, the CPU 21 may receive the user's input of an instruction of registering a communication device of an on-water vehicle other than the PWC, a communication device of a specific user, a communication device of a predetermined manager, or the like as a specific communication target and may store the specific communication target in the storage memory 23.

When the PWC 1 is in a travelable state, such as an idling state, or while the PWC 1 is traveling, the PWC 1 performs sensing of the peripheral object around the PWC 1 (Step S3). The periphery recognition support unit 20 acquires the position related data related to the positional relation between the PWC 1 and the peripheral object. For example, each of the object sensors 26 and 33 detects an object distance correlated to the distance from the PWC 1 to the peripheral object. The object distance may be acquired by directly detecting the distance from the PWC 1 to the peripheral object or may be acquired by detecting the position of the PWC 1 and the position of the peripheral object and then calculating the distance therebetween.

When each of the object sensors 26 and 33 is a sonar or a radar sensor, each of the object sensors 26 and 33 detects the object distance based on the sound wave or the electromagnetic wave reflected by the peripheral object. When each of the object sensors 26 and 33 is a camera, each of the object sensors 26 and 33 detects the object distance based on image processing technology and perspective. The CPU 21 may recognize, through the object sensor 26, a radio wave status of the communication terminal 4 worn by the human 3 who is not in the PWC and determine the degree of approach between the PWC 1 and the human 3 based on the radio wave status. In this case, the communication terminal 4 may be a RFID tag, a Bluetooth device, or the like. With this, the human 3 in the vicinity of the PWC 1 can be easily detected.

Each of the object sensors 26 and 33 may detect an object direction based on a direction of the sensing performed by utilizing a sound wave, an electromagnetic wave, or light, the object direction indicating a direction of the presence of the peripheral object based on the PWC 1. The position related data may include the object distance and the object direction.

The sensing in Step S3 is not limited to the sensing performed by the object sensors 26 and 30. When the peripheral object detects its own position coordinates, the periphery recognition support unit 20 of the PWC 1 may receive, from the peripheral object by the first transceiver 28, object position data indicating the position coordinates of the peripheral object. The PWC 2 that may be the peripheral object detects the position coordinates of the PWC 2 by satellite positioning. The communication terminal 4 of the human 3 who may be the peripheral object also detects the position coordinates of the PWC 2 by satellite positioning. The periphery recognition support unit 20 of the PWC 1 receives, from the own position sensor 27, the own position data indicating the position coordinates of the PWC 1. Therefore, the position related data related to the positional relation between the PWC 1 and the peripheral object may include the position coordinates of the PWC 1 and the position coordinates of the peripheral object.

The periphery recognition support unit 20 of the PWC 1 may receive, through the first transceiver 28, the object position data indicating the position coordinates of the PWC 2 wirelessly transmitted from the first transceiver 28 of the PWC 2. The periphery recognition support unit 20 of the PWC 1 may receive, through the second transceiver 29, the object position data indicating the position coordinates of the human 3 wirelessly transmitted from the communication terminal 4 of the human 3. In these cases, each of the transceivers 28 and 29 may be the object sensor in the broad sense. The object distance may be acquired by detecting the position coordinates of the PWC 1 and the position coordinates of the peripheral object and calculating a distance between these position coordinates.

The position related data may include a relative vector including a relative speed between the PWC 1 and the peripheral object and a relative movement direction between the PWC 1 and the peripheral object. The periphery recognition support unit 20 acquires the speed of the PWC 1 from the traveling speed sensor 35. The periphery recognition support unit 20 may receive the speed of the PWC 2 from the first transceiver 28 of the PWC 2 or receive the speed of the human 3 from the communication terminal 4 of the human 3. The periphery recognition support unit 20 may calculate the speed of the peripheral object based on a change amount of the position coordinates of the peripheral object. The relative speed between the PWC 1 and the peripheral object may be calculated based on the speed of the PWC 1 and the speed of the peripheral object.

The periphery recognition support unit 20 may receive the movement direction of the PWC 2 from the first transceiver 28 of the PWC 2 through the first transceiver 28 of the PWC 1. The periphery recognition support unit 20 may receive the relative position of the human 3 relative to the PWC 1 or the relative movement direction of the human 3 relative to the PWC 1 through the second transceiver 29 of the PWC 1. The periphery recognition support unit 20 may calculate the movement direction of the peripheral object based on a most recent movement trajectory of the position coordinates of the peripheral object. The movement direction of the PWC 1 may be calculated based on a most recent movement trajectory of the position coordinates of the PWC 1. The relative movement direction between the PWC 1 and the peripheral object may be calculated based on the movement direction of the PWC 1 and the movement direction of the peripheral object.

The periphery recognition support unit 20 may acquire the speed and movement direction of the PWC 1 and the speed and movement direction of the peripheral object in such a manner that a configuration realized by executing the periphery recognition support program by the CPU 21 calculates the speed and movement direction of the PWC 1 and the speed and movement direction of the peripheral object. However, the periphery recognition support unit 20 may acquire such information by receiving the information from the peripheral object or the server 41. The periphery recognition support unit 20 may acquire the relative speed between the PWC 1 and the peripheral object in such a manner that the configuration realized by executing the periphery recognition support program by the CPU 21 calculates the relative speed between the PWC 1 and the peripheral object based on the speed of the PWC 1 and the speed of the peripheral object. However, the periphery recognition support unit 20 may acquire the relative speed between the PWC 1 and the peripheral object by receiving the relative speed from the peripheral object or the server 41. The periphery recognition support unit 20 may acquire the relative movement direction between the PWC 1 and the peripheral object in such a manner that the configuration realized by executing the periphery recognition support program by the CPU 21 calculates the relative movement direction between the PWC 1 and the peripheral object based on the movement direction of the PWC 1 and the movement direction of the peripheral object. However, the periphery recognition support unit 20 may acquire the relative movement direction between the PWC 1 and the peripheral object by receiving the relative movement direction from the peripheral object or the server 41.

The peripheral object may include a predetermined regulated area. The regulated area may be, for example, a speed restricted area, a travel prohibited area, a user setting area, or the like. A position coordinate range of the regulated area may be stored in the storage memory 23 in advance or may be received from the server 41 through the network N. When the regulated area is the travel prohibited area, the peripheral object may be a virtual outer edge of the travel prohibited area.

The peripheral object may include a virtual outer edge of the travelable area. The position of the virtual outer edge of the travelable area may be determined by calculation. The travelable area may be an area where the PWC 1 can return to land by the remaining amount of the energy source of the PWC 1. The CPU 21 receives, from the remaining amount sensor 34, remaining amount data indicating the remaining amount of the energy source of the PWC 1. The CPU 21 calculates a distance that the PWC 1 can travel by using the current remaining amount of the energy source. A travelable distance may be calculated based on past fuel efficiency data indicating a travel distance per unit remaining amount. The virtual outer edge of the travelable area may be determined based on the travelable distance and a return position on land. The return position may be a travel start position. The travel start position may be a position at which a power supply of the periphery recognition support unit 20 has been turned on or a position specified by a user through the user input interface 25.

Figure 5:
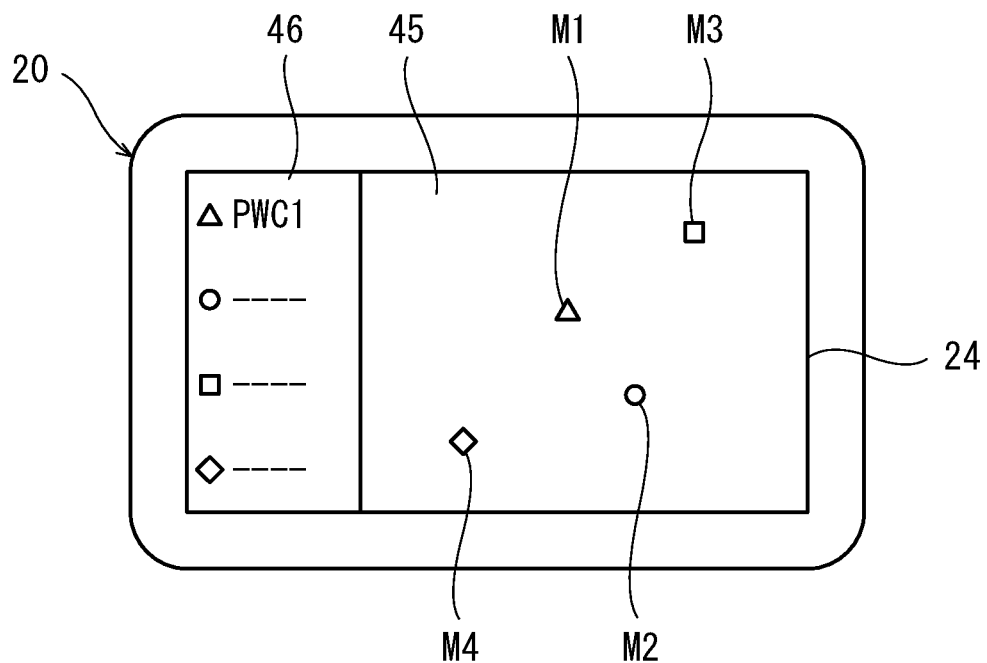
FIG. 5 is a diagram showing a display screen image of a periphery recognition support unit shown in FIG. 3.

The CPU 21 displays the generated position related data on the display 24 (Step S4). As shown in FIG. 5, the display screen image displayed on the display 24 of the periphery recognition support unit 20 includes a map screen image 45 and a list screen image 46. The map screen image 45 displays an own mark M1 indicating the position of the PWC 1 and object marks M2 to M4 indicating the positions of the peripheral objects. FIG. 5 shows an example in which the peripheral objects are PWCs of others. The rider of the PWC 1 can see the map screen image 45 to recognize the positional relation among the PWC 1 and the peripheral objects.

The list screen image 46 displays, for example, a relation between the marks M2 to M4 of the specific PWCs registered to the same group as the PWC 1 and attribute information such as user names of the marks M2 to M4. The rider of the PWC 1 can refer to the map screen image 45 and the list screen image 46 to recognize the positions of members belonging to the same group as the rider of the PWC 1.

Referring back to FIG. 4, the CPU 21 determines whether or not the position related data generated as above satisfies a predetermined warning condition (Step S5). The warning condition includes a condition that the position related data indicates current or future approach between the PWC 1 and the peripheral object. Specifically, the warning condition includes a condition that the object distance correlated to the distance between the PWC 1 and the peripheral object is less than a predetermined threshold.

Figure 6:
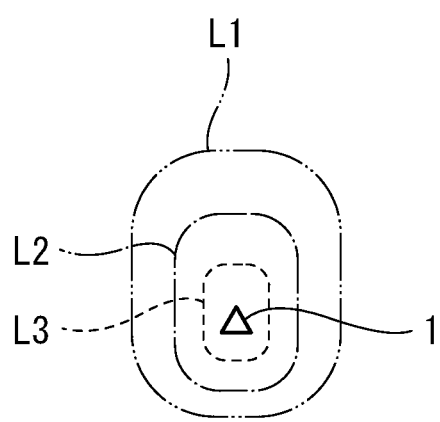
FIG. 6 is a schematic diagram for explaining a warning condition when the PWC is idling.
Figure 7:
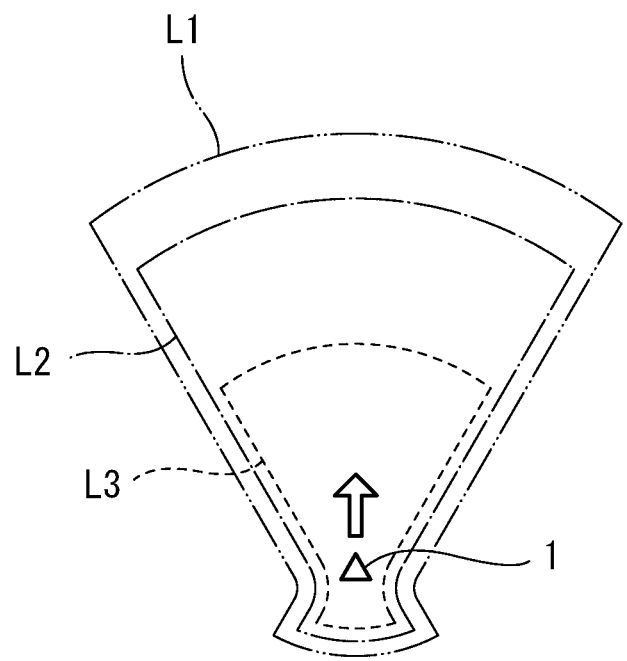
FIG. 7 is a schematic diagram for explaining the warning condition when the PWC is traveling linearly.
Figure 8:
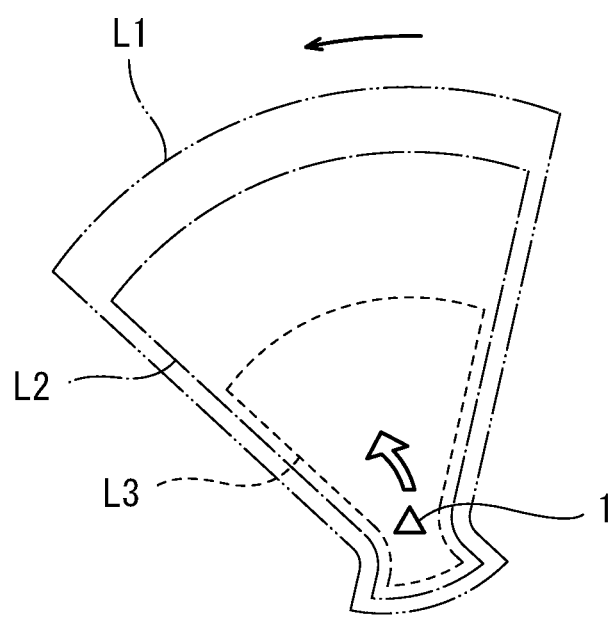
FIG. 8 is a schematic diagram for explaining the warning condition when the PWC is turning.

FIG. 6 is a schematic diagram for explaining the warning condition when the PWC 1 is idling. FIG. 7 is a schematic diagram for explaining the warning condition when the PWC 1 is traveling linearly. FIG. 8 is a schematic diagram for explaining the warning condition when the PWC 1 is turning. As shown in FIGS. 6 to 8, the condition that the object distance is less than the threshold may include a condition that the peripheral object exists in at least one warning region based on the PWC 1. To be specific, an outer edge of the warning region may correspond to the threshold. To make the warning condition easily satisfied, the threshold of the object distance may be increased by expanding the warning region.

The warning condition may differ depending on the type of the peripheral object. For example, the threshold of the object distance may be set so as to differ depending on the type of the peripheral object. For example, when the peripheral object is a movable object, such as the PWC 2, the warning condition may be set so as to be more easily satisfied than when the peripheral object is an immovable, fixed object. A warning range may be enlarged as an expected movement speed of the movable object increases. A determination frequency per unit time of the warning condition directed to the movable object may be set higher than a determination frequency per unit time of the warning condition directed to the fixed object.

The at least one warning region may include warning regions set stepwisely for respective types of warning targets. For example, the warning regions include a warning region L1 in which the warning targets are the other PWCs, a warning region L2 in which the warning targets are the fixed objects, and a warning region L3 in which the warning targets are humans. Each of the warning regions L1 to L3 has such a shape that a part thereof in front of the PWC 1 is larger than a part thereof behind the PWC 1.

As shown in FIGS. 6 and 7, each of the warning regions L1 to L3 at the time of the traveling may have a shape, such as a fan shape in plan view, which has a wider angle in a front direction than each of the warning regions L1 to L3 at the time of the travelable state, such as the idling state. In other words, each of the warning regions L1 to L3 at the time of the travelable state, such as the idling state, may have a shape closer to a circular shape or a rectangular shape in plan view than each of the warning regions L1 to L3 at the time of the traveling. At the time of the traveling, a part of each of the warning regions L1 to L3 which part is located just beside the PWC 1 may be made the smallest.

As shown in FIG. 7, a part of each of the warning regions L1 to L3 which part is located in the proceeding direction when viewed from the PWC 1 is larger than parts of each of the warning regions L1 to L3 other than the part of each of the warning regions L1 to L3 which part is located in the proceeding direction when viewed from the PWC 1. The warning regions L1 to L3 may change so as to become large as the speed of the PWC 1 increases. The warning regions L1 to L3 may become large in the front direction of the PWC 1 as a forward speed of the PWC 1 increases. The warning regions L1 to L3 may become large in the rear direction of the PWC 1 as a backward speed of the PWC 1 increases. The warning regions L1 to L3 may become small in the rear direction of the PWC 1 as the forward speed of the PWC 1 increases. The warning regions L1 to L3 may become small in the front direction of the PWC 1 as the backward speed of the PWC 1 increases.

As shown in FIG. 8, the angular displacement of the warning regions L1 to L3 may be performed in the horizontal direction based on the PWC 1 in accordance with a change in the traveling direction of the PWC 1. The angular displacement of the warning regions L1 to L3 may be performed in a steering direction based on the PWC 1 in accordance with the steering angle of the PWC 1. The angular displacement of the warning regions L1 to L3 may increase as the steering angle of the PWC 1 increases.

When it is determined that the warning condition is not satisfied (No in Step S5), the sensing is continued (Step S3). When it is determined that the warning condition is satisfied (Yes in Step S5), the CPU 21 outputs a warning signal (Step S6). A destination to which the warning signal is output may be the display 24, the ECU 32, the specific PWC, the server 41, or the like. The warning signal may include object position information indicating the position of the peripheral object that has satisfied the warning condition, the identification information of the peripheral object that has satisfied the warning condition, identification information of an output source from which the warning signal is output, information regarding a warning type, or any combination thereof.

Figure 9:
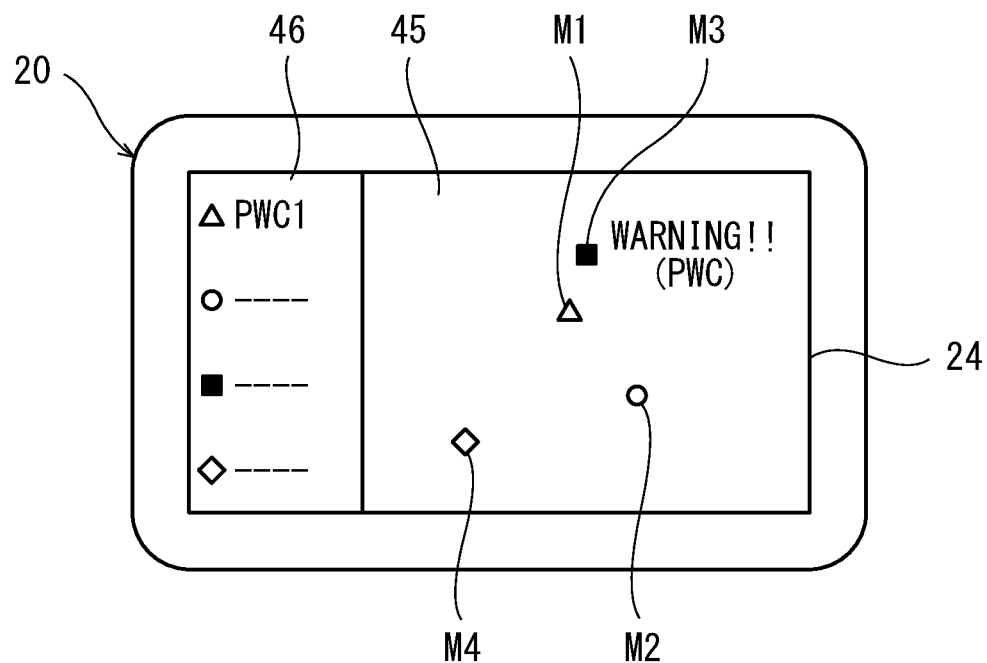
FIG. 9 is a diagram showing a first example of the display screen image at the time of warning in the periphery recognition support unit shown in FIG. 3.

FIG. 9 is a diagram showing a first example of the display screen image at the time of warning in the periphery recognition support unit 20 shown in FIG. 3. As shown in FIG. 9, the display 24 that has received the warning signal displays warning information that is recognizable by the user who is driving (Step S7). For example, the display 24 displays the object mark M3 indicating the peripheral object that has satisfied the warning condition, as a warning display image that is different from a normal display image. The warning display image that is different from the normal display image may be an emphasized display image. The object mark M3 indicating the peripheral object that has satisfied the warning condition may be displayed as, for example, a flashing display image, a color change display image, an enlarged display image, a luminance change display image, a text addition display image, or any combination thereof.

FIG. 9 shows an example in which the peripheral object that has satisfied the warning condition is the PWC, and the mark M3 indicating the PWC is shown as the emphasized display image. The warning display image may change in accordance with the distance between the peripheral object in the warning region and the PWC 1. For example, as the peripheral object that has entered the warning region further approaches the PWC 1, the degree of emphasis of the warning display image may be increased continuously or stepwisely.

Figure 10:
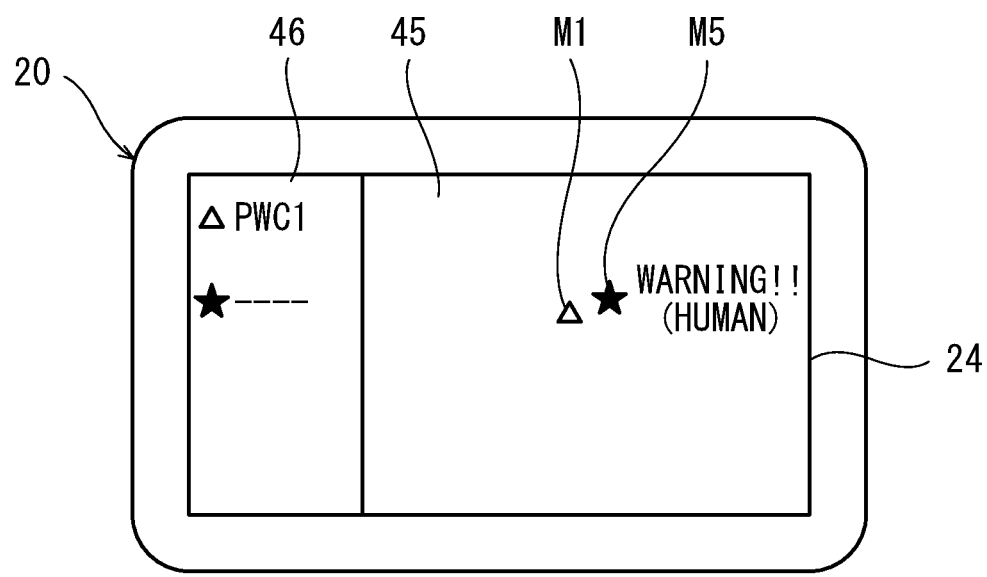
FIG. 10 is a diagram showing a second example of the display screen image at the time of the warning in the periphery recognition support unit shown in FIG. 3.

FIG. 10 is a diagram showing a second example of the display screen image at the time of the warning in the periphery recognition support unit 20 shown in FIG. 3. FIG. 10 shows an example in which the peripheral object that has satisfied the warning condition is a human, and the mark M5 indicating the human is shown as the emphasized display image. The warning display image when the human has satisfied the warning condition is different from the warning display image when the PWC has satisfied the warning condition.

Figure 11:
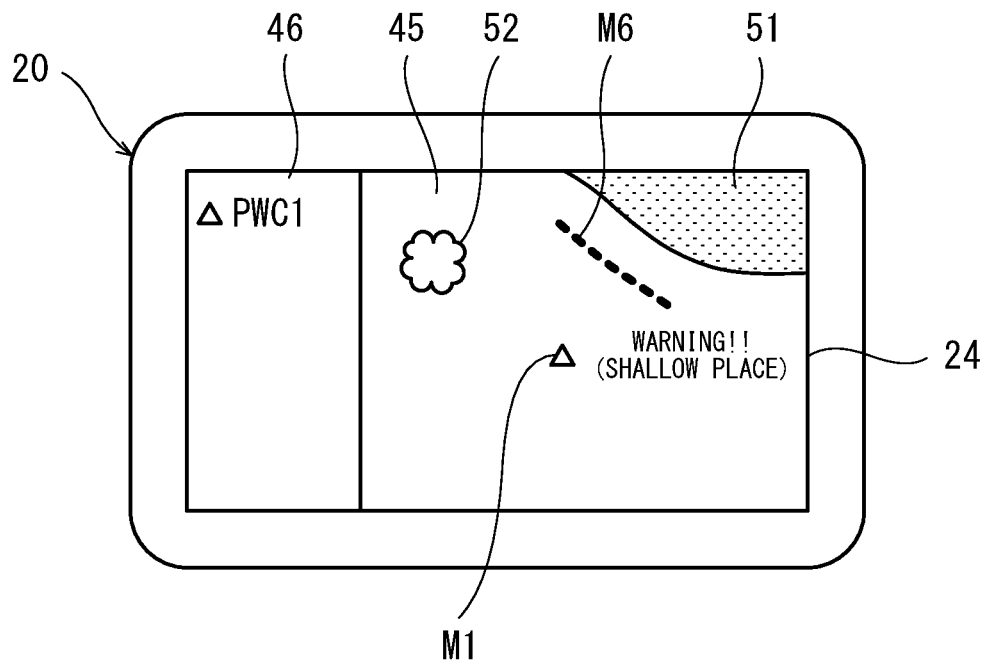
FIG. 11 is a diagram showing a third example of the display screen image at the time of the warning in the periphery recognition support unit shown in FIG. 3.

FIG. 11 is a diagram showing a third example of the display screen image at the time of the warning in the periphery recognition support unit 20 shown in FIG. 3. In FIG. 11, the display 24 displays a sandy beach 51 and a reef 52 that may be the peripheral objects. When the PWC 1 travels a shallow place, the distance from the PWC 1 to the water bottom becomes short. When the water bottom enters the warning range L2 (FIG. 7) based on the PWC 1, the display 24 displays, as the warning, a mark M6 indicating the shallow place.

Figure 12:
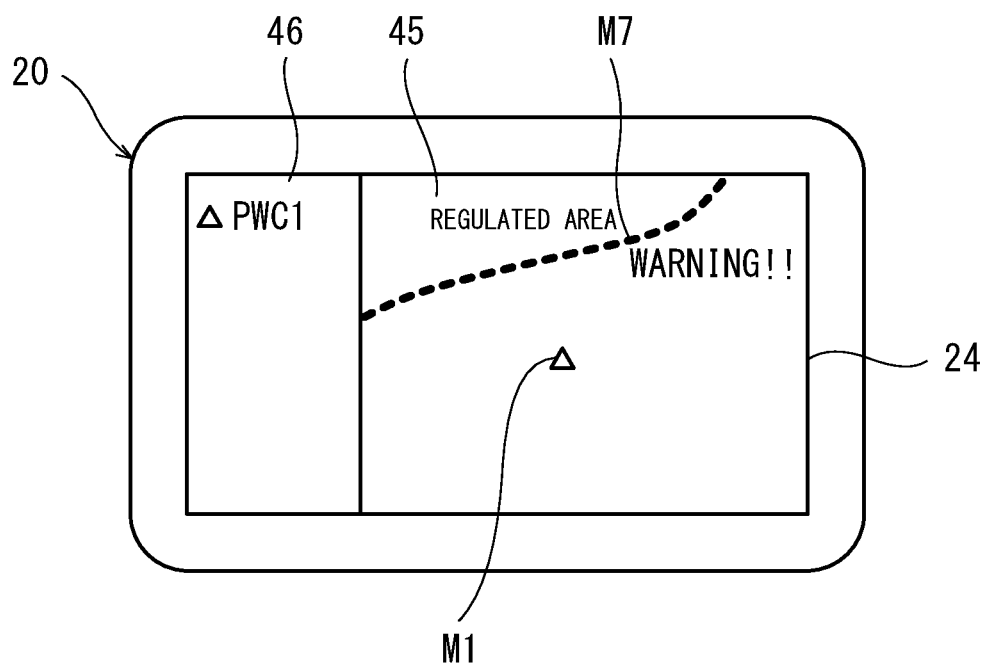
FIG. 12 is a diagram showing a fourth example of the display screen image at the time of the warning in the periphery recognition support unit shown in FIG. 3.

FIG. 12 is a diagram showing a fourth example of the display screen image at the time of the warning in the periphery recognition support unit 20 shown in FIG. 3. As shown in FIG. 12, when the PWC 1 approaches the regulated area, the distance from the PWC 1 to the profile line of the regulated area becomes short. When the profile line of the regulated area enters the warning range L2 (FIG. 7) based on the PWC 1, the display 24 displays, as the warning, a mark M7 indicating the regulated area.

Figure 13:
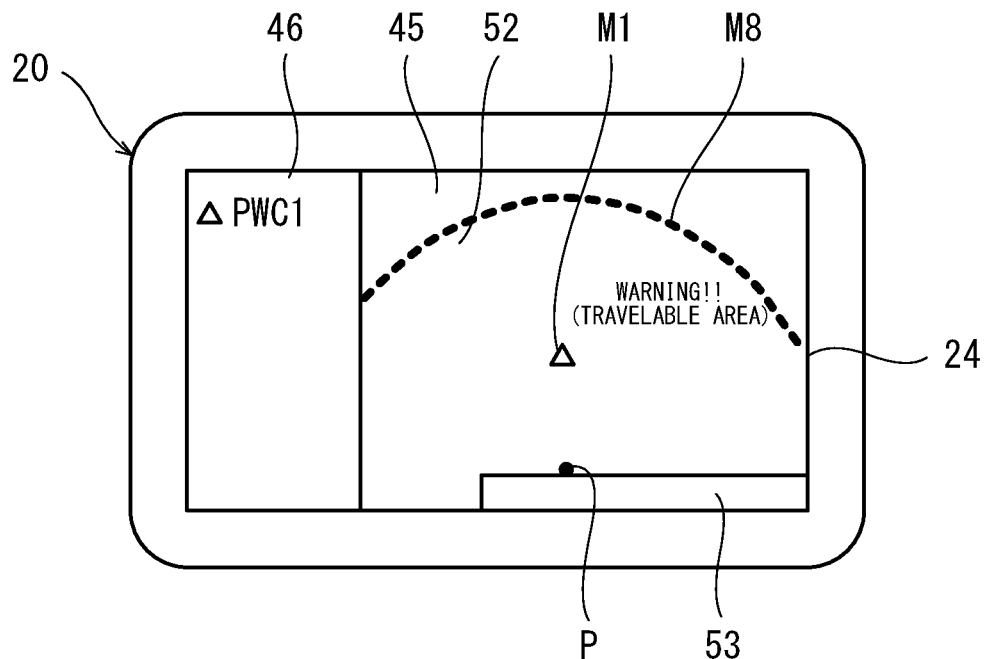
FIG. 13 is a diagram showing a fifth example of the display screen image at the time of the warning in the periphery recognition support unit shown in FIG. 3.

FIG. 13 is a diagram showing a fifth example of the display screen image at the time of the warning in the periphery recognition support unit 20 shown in FIG. 3. As shown in FIG. 13, the travelable area is determined by the travelable distance calculated based on the current remaining amount of the energy source and the past fuel efficiency data. For example, the virtual outer edge of the travelable area may be a circle having the return position P as the center and the travelable distance as the radius. When the PWC 1 approaches the outer edge of the travelable area, and the outer edge of the travelable area enters the warning range L2 (FIG. 7) based on the PWC 1, the display 24 displays, as the warning, a mark M8 indicating the travelable area.

The outer edge of the travelable area does not have to be based on the return position P and may be set so as to extend along an outer edge of land 53. The outer edge of the travelable area may be set in accordance with the remaining amount of the energy source, and in addition, the flow of water, the direction of wind, or an estimated return time. For example, when the PWC 1 needs to travel to the return position P against the flow of water or wind, the travelable area may be narrowed. As the estimated return time approaches, the travelable area may be narrowed.

As shown in FIGS. 9 to 13, the periphery recognition support unit 20 may change the warning display image in accordance with the type of the peripheral object that has satisfied the warning condition. As long as the types of the peripheral objects that have satisfied the warning condition can be identified, the display images may be distinguished by shapes, texts, or symbols of the marks M3 and M5 to M8. The periphery recognition support unit 20 may change the warning display image in accordance with whether the peripheral object that has satisfied the warning condition is the movable object or the fixed object. The degree of emphasis of the warning display image when the peripheral object that has satisfied the warning condition is the movable object may be higher than that of the warning display image when the peripheral object that has satisfied the warning condition is the fixed object.

The output of the warning information that is recognizable by the user who is driving is not limited to visual output and may be auditory output or tactile output. A user interface that performs the auditory output is, for example, a speaker. A user interface that performs the tactile output is, for example, a vibrator. After the warning information is output to the user as above, the process returns to Step S3.

The warning signal may also be output to other PWCs in accordance with the warning type. The warning type is set in accordance with targets to be warned. The warning type may be set such that the number of targets to be warned increases stepwisely. Specifically, the warning type may be set such that in addition to the warning output (Step S7) in the PWC 1, the warning information is also transmitted to other PWCs. For example, when the warning type is "1" (warning to other PWCs; Yes in Step S8), the periphery recognition support unit 20 transmits the warning signal to other PWCs (Step S9). In this case, the warning signal may be broadcasted to other PWCs or may be transmitted to only the specific PWCs registered in Step S2. When the warning type is not "1" (No in Step S8), the warning signal is not transmitted to other PWCs. A condition based on which the warning type becomes "1" may include a condition that it is determined that another PWC has entered the warning region L1 of the PWC 1.

The warning signal may be output to the server 41 in accordance with the the warning type. For example, when the warning type is "2" (transmission to the server; Yes in Step S10), the periphery recognition support unit 20 transmits the warning signal to the server 41 through the network N (Step S11). The server 41 stores, as a log, information contained in the warning signal. Specifically, the server 41 stores, as the log, position information of a place where the warning is generated and information of the peripheral object that has satisfied the warning condition.

The information stored in the server 41 may be accessed by the periphery recognition support unit 20 or the mobile information terminal 40. A condition based on which the warning type becomes "2" may include a condition that it is determined that the fixed object has entered the warning region L2 of the PWC 1. By accumulating in the server 41 the warning information indicating the approach between the fixed object and the PWC 1, a position at which the approach between the fixed object and the PWC 1 frequently occurs can be specified by the accumulated information, and therefore, the accumulated information can be utilized to alert the rider. When the warning type is not "2" (No in Step S10), the warning signal is not transmitted to the server 41. Steps S8 and S9 may be omitted, or Steps S10 and S11 may be omitted. Or, Steps S8, S9, S10, and S11 may be omitted.

When the ECU 32 of the PWC 1 receives the warning signal from the periphery recognition support unit 20, the ECU 32 of the PWC 1 may suppress the output of the prime mover E of the PWC 1. The suppression of the output of the prime mover E may be control of reducing an upper limit of the traveling speed. The suppression of the output of the prime mover E may be control of reducing the rotational speed or torque of the prime mover E. The suppression of the output of the prime mover E may be control of reducing a required output by a predetermined ratio, the required output being determined in accordance with the detected value of the accelerator sensor 31. The suppression of the output of the prime mover E may be control of stopping the output of the prime mover E. The suppression of the output of the prime mover E may be control of activating a lock mechanism that mechanically restricts acceleration manipulation of the accelerator lever. The suppression of the output of the prime mover E may be executed immediately when the warning condition is satisfied. The suppression of the output of the prime mover E may be executed after a predetermined delay time has elapsed since the warning condition is satisfied. For example, the ECU 32 may start counting the predetermined delay time when the ECU 32 receives the warning signal, and after the completion of the counting, the ECU 32 may start the suppression of the output of the prime mover E.

Figure 14:
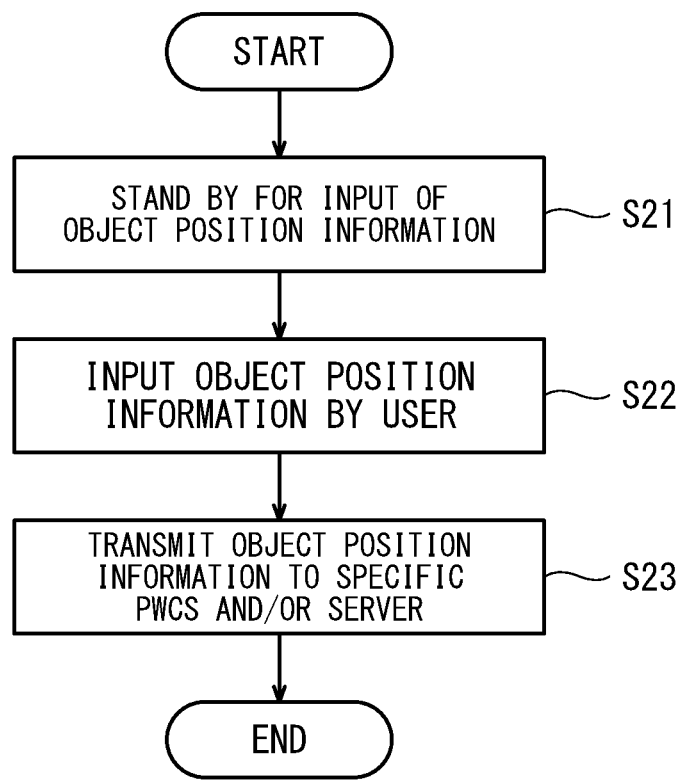
FIG. 14 is a flow chart showing object registration processing in the periphery recognition support system shown in FIG. 3.

FIG. 14 is a flow chart showing object registration processing in the periphery recognition support system 100 shown in FIG. 3. As shown in FIG. 14, the CPU 21 displays the user input screen image on the display 24 in accordance with predetermined input manipulation and stands by for the user's input of the object position information indicating the position of the peripheral object (Step S21). The user manipulates the user input interface 25 to input the object position information (Step S22). For example, the user inputs the object position information regarding the peripheral objects, such as the water bottom of the shallow place and obstacles, for his/her and other people's future travel. The object position information may include not only the position of the peripheral object but also the name, detail information, and the like of the peripheral object.

The CPU 21 may transmit the input object position information to other PWCs. The object position information may be transmitted to only the specific PWCs (Step S23). The CPU 21 may transmit the input object position information to the server 41. The server 41 stores, as a log, information contained in the object position information. The information stored in the server 41 may be accessed by the periphery recognition support unit 20 or the mobile information terminal 40. The functions shown in FIG. 14 may be omitted.

The warning condition may include a condition regarding the relative vector including the relative speed between the PWC 1 and the peripheral object and the relative movement direction between the PWC 1 and the peripheral object. The position related data may separately include a movement vector of the PWC 1 and a movement vector of the peripheral object. The warning condition may be a condition that: the relative movement direction between the PWC 1 and the peripheral object indicates that the PWC 1 and the peripheral object relatively move so as to approach each other; and the object distance is less than the threshold. The warning condition may be a condition that: the relative vector indicates that the PWC 1 and the peripheral object relatively move so as to approach each other, and the relative speed is a threshold or more; and the object distance is less than the threshold. The position related data may be such data as not to include one of the movement vector of the PWC 1 and the movement vector of the peripheral object but to include the other of the movement vector of the PWC 1 and the movement vector of the peripheral object.

The threshold of the object distance may change in accordance with a change in the relative vector including the relative movement direction between the PWC 1 and the peripheral object and the relative speed between the PWC 1 and the peripheral object. To be specific, the threshold of the object distance may increase as the relative vector changes such that the tendency of early approach between the PWC 1 and the peripheral object becomes strong. For example, the threshold of the object distance when the relative movement direction between the PWC 1 and the peripheral object indicates that the PWC 1 and the peripheral object approach each other may be made larger than the threshold of the object distance when the relative movement direction between the PWC 1 and the peripheral object indicates that the PWC 1 and the peripheral object move away from each other. For example, the threshold of the object distance when the relative speed between the PWC 1 and the peripheral object is high may be made larger than the threshold of the object distance when the relative speed between the PWC 1 and the peripheral object is low.

Figure 15:
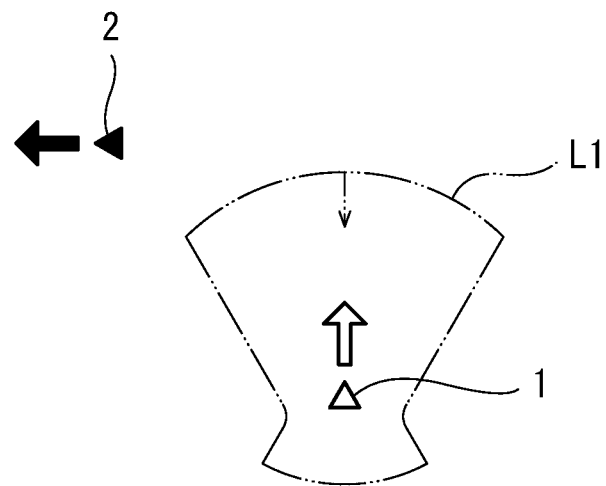
FIG. 15 is a schematic diagram for explaining a first modified example of the warning condition when the PWC is traveling.
Figure 16:
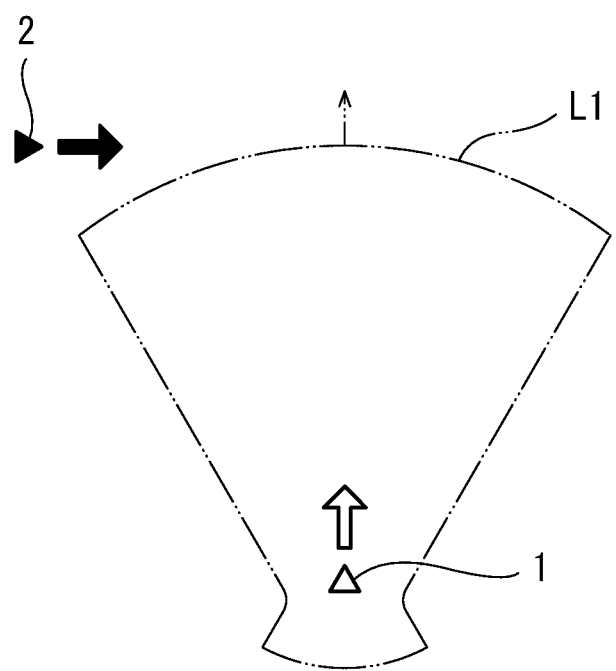
FIG. 16 is a schematic diagram for explaining the first modified example of the warning condition when the PWC is traveling.

For example, the warning region L1 based on the PWC 1 when the PWC 2 travels so as to approach the PWC 1 as shown in FIG. 16 may be made smaller than the warning region L1 based on the PWC 1 when the PWC 2 travels so as to move away from the PWC 1 as shown in FIG. 15. When the PWC 2 travels so as to approach the PWC 1, the warning region L1 may be made small as the relative speed between the PWC 1 and the PWC 2 increases. When the PWC 2 travels so as to move away from the PWC 1, the warning region L1 may be made large as the relative speed between the PWC 1 and the PWC 2 increases.

The warning condition may be common regardless of the traveling speed and traveling direction of the PWC 1. The warning condition may be common without being changed in accordance with the type of the peripheral object. The object distance may be corrected in accordance with the flow of water or wind. When there is such flow that the PWC 1 approaches the peripheral object, the warning region L1 may be corrected so as to be made large. When there is such flow that the PWC 1 moves away from the peripheral object, the warning region L1 may be corrected so as to be made small. The warning condition may be changed in accordance with whether the peripheral object is an on-water obstacle or an in-water obstacle. Regarding the in-water obstacle, the warning condition may be changed in accordance with the date and time or the rise and fall of the tide. To be specific, the warning condition regarding the in-water obstacle may be changed between the low tide and the high tide. For example, the warning region L2 may be set large at the time of the low tide and may be set small at the time of the high tide.

Figure 17:
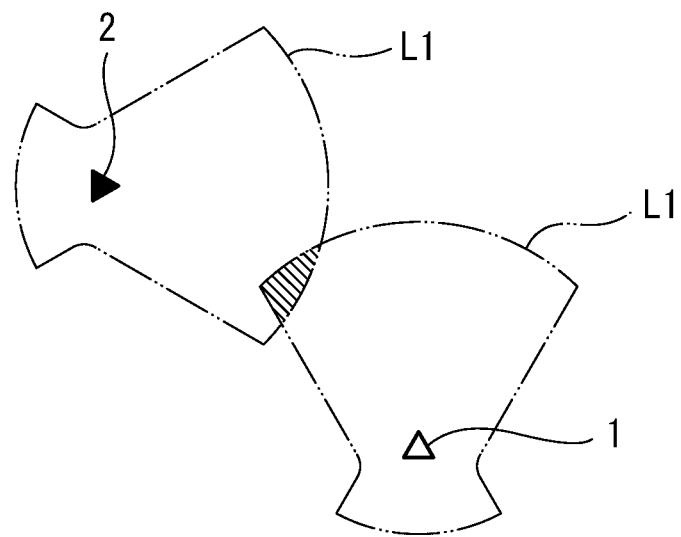
FIG. 17 is a schematic diagram for explaining a second modified example of the warning condition when the PWC is traveling.

FIG. 17 is a schematic diagram for explaining a second modified example of the warning condition when the PWC 1 is traveling. As shown in FIG. 17, when the warning region L1 based on the PWC 2 partially overlaps the warning region L1 based on the PWC 1, the periphery recognition support system 20 of the PWC 1 may determine that the warning condition is satisfied. To be specific, the outer edge of the warning region L1 based on the PWC 2 may be set as the peripheral object.

Figure 18:
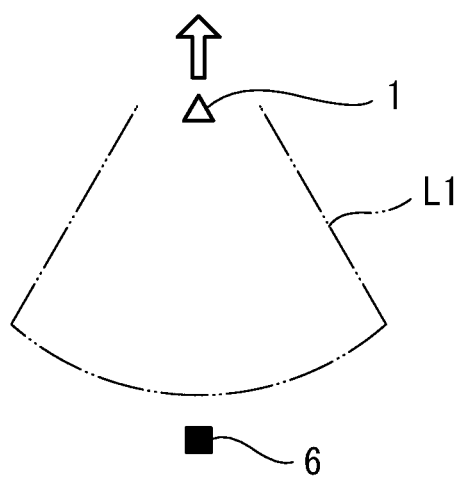
FIG. 18 is a schematic diagram for explaining a third modified example of the warning condition when the PWC is traveling.

FIG. 18 is a schematic diagram for explaining a third modified example of the warning condition when the PWC 1 is traveling. As shown in FIG. 18, the warning condition may include a condition that the position related data indicates that the PWC 1 and a peripheral object 6 separate from each other. Specifically, the warning condition may include a condition that the object distance correlated to the distance between the PWC 1 and the peripheral object 6 has exceeded the predetermined threshold. For example, the PWC may tow a water ski, a boat, or a parasail. When the water skier releases a tow rope, or when a person on the towed boat leaves the boat, the warning condition may be satisfied. Specifically, when the periphery recognition support unit 20 of the PWC 1 determines that a human 6 towed by the PWC 1 separates rearward from the PWC 1 by more than a predetermined distance, the periphery recognition support unit 20 of the PWC 1 may determine that the warning condition is satisfied. For example, when it is determined that a communication terminal worn by the towed human 6 or a communication terminal provided at the towed object is outside a radio wave range of the second transceiver 29 of the periphery recognition support unit 20 of the PWC 1, it may be determined that the warning condition is satisfied. The second transceiver 29 of the periphery recognition support unit 20 of the PWC 1 may be provided so as to be able to perform radio wave transmission and reception with respect to the towed human 6, a towing person, and a towed object (such as a boat) connected to the tow rope.

The warning condition may be changed in accordance with an ambient environment of the PWC 1. For example, when it is determined that the ambient environment of the PWC 1 is a low-visibility environment, such as nighttime or fog, the threshold of the object distance may be increased such that the warning condition is easily satisfied. Information of the ambient environment of the PWC 1 may be received by the periphery recognition support unit 20 through the network N or may be detected by a sensor of the periphery recognition support unit 20.

The periphery recognition support program may be partially or entirely executed by the mobile information terminal 40. The periphery recognition support program may be partially or entirely executed by the server 41. The periphery recognition support program may be partially or entirely executed by the ECU 32 mounted on the PWC 1. The periphery recognition support program may be subjected to distributed processing.

According to the above-described configuration, the warning signal is output when the position related data related to the positional relation between the PWC 1 and the peripheral object satisfies the warning condition. Therefore, the convenience for the rider of the PWC having a high degree of freedom of the traveling direction and a high degree of freedom of the traveling route improves.

According to the configuration in which the warning signal is output when the position related data indicates the current or future approach between the PWC 1 and the peripheral object, the rider of the PWC 1 can recognize the peripheral object that approaches or may approach the PWC 1, and manipulate the PWC 1.

According to the configuration in which the warning signal is output when the object distance correlated to the distance from the PWC 1 to the peripheral object is less than the threshold, the rider of the PWC 1 easily prevents the PWC 1 from approaching the peripheral object.

According to the configuration in which the peripheral objects include an object located under the water surface of the water area W, the bottom of the PWC 1 is easily prevented from approaching the water bottom, the in-water obstacle, and the like.

According to the configuration in which the position related data includes the relative speed between the PWC 1 and the peripheral object or the relative movement direction between the PWC 1 and the peripheral object, the future distance between the PWC 1 and the peripheral object can be predicted, and the warning signal can be then output. Thus, the approach of the PWC 1 to the peripheral object is easily prevented in advance.

According to the configuration in which the warning signal includes an instruction of making the display 24 output the warning information that is recognizable by the rider of the PWC 1, the rider of the PWC 1 can recognize that the warning condition is satisfied. Thus, the rider of the PWC 1 can perform driving manipulation based on the warning.

According to the configuration in which the warning signal includes an instruction of making the display 24 display the object mark M3 that has satisfied the warning condition, as a display image different from the normal display image, the rider of the PWC 1 can easily recognize on the display 24 the peripheral object that has satisfied the warning condition. Thus, the convenience for the user improves.

According to the configuration in which the periphery recognition support unit 20 receives the user's input of the object position information, the user can register the peripheral object about which the user should be careful. Thus, the user can perform periphery recognition while utilizing past experience.

According to the configuration in which the peripheral object includes a predetermined regulated area, the warning signal can prevent the PWC 1 from traveling against the regulation of the regulated area.

According to the configuration in which the peripheral object includes the virtual outer edge of the travelable area, and the virtual outer edge of the travelable area is determined based on the remaining amount data indicating the remaining amount of the energy source of the PWC 1, it is possible to prevent a case where the remaining amount of the energy source (such as fuel or a battery) is used up on water, and therefore, the PWC 1 cannot return to land.

According to the configuration in which the warning signal includes an instruction of suppressing the output of the prime mover E of the PWC 1, the speed of the PWC 1 is automatically suppressed (reduced or reduced to zero) when the warning condition is satisfied. Thus, the rider of the PWC 1 can concentrate on traveling. For example, when the PWC 1 should travel at low speed, such as when the PWC 1 travels in the speed restricted area or in an area where other PWCs gather, the rider of the PWC 1 does not have to pay attention to the speed. Thus, a driving burden can be reduced.

According to the configuration in which the warning signal includes the object position information indicating the position of the peripheral object, and the warning signal is transmitted to the server 42, the server 42 can receive the object position data from the PWCs and accumulate a large number of pieces of the object position data. Therefore, the server 42 can provide the positions of various peripheral objects. For example, when the server 42 accumulates information of the peripheral objects, such as the sandy beach, the shallow place, and the reef, the server 42 can provide the warning information regarding the obstacles under the water surface to a PWC which does not include a sensor that can detect the obstacles under the water surface. Thus, the user who received the warning information regarding the shallow place can prevent troubles caused when the PWC sucks sand.

According to the configuration in which the periphery recognition support unit 20 receives the user's input of registering one or more other PWCs as the specific PWCs, and the warning signal is transmitted to the specific PWCs, the warning information is transmitted only to limited people concerned (such as group members or group leaders). Thus, selective information provision can be performed.

According to the configuration in which the position of the peripheral object is detected by the object sensors 26 and 33, the positional relation between the PWC 1 and the peripheral object can be easily recognized even on the huge ocean.

The periphery recognition support unit 20 of the PWC 1 acquires the position information of the peripheral object by RF communication through the first transceiver 28. Therefore, even when the PWC 1 travels outside the radio wave transmission/reception range of the base station that is a fixed facility, the periphery recognition support unit 20 of the PWC 1 can acquire the position information of the peripheral object over a wide range.

The foregoing has described a case where the periphery recognition support system 100 includes the periphery recognition support unit 20 including a casing in which components necessary for the support of the periphery recognition are housed. However, the above embodiment is not limited to this. For example, the components necessary for the support of the periphery recognition may be arranged separately from each other and may be electrically connected to each other so as to be communicable with each other. The first transceiver 28 and the own position sensor 27 may be arranged at a watercraft body position suitable for radio wave reception. The display 24 may be arranged at a watercraft body position that can be visually confirmed by the rider in a driving posture. The CPU 21 and the memories 22 and 23 may be disposed in a waterproof space in the watercraft body. As above, the components necessary for the support of the periphery recognition may be arranged at positions suitable for the respective components.

Part of the periphery recognition support unit 20 may be included in the PWC in advance as standard equipment. For example, an own position sensor included in the PWC as the standard equipment may be used as the own position sensor 27. Similarly, a meter included in the PWC as the standard equipment may be used as the display 24. Since the periphery recognition support system 100 is realized by utilizing the components included in the PWC as the standard equipment, the number of components of the PWC which are applied to the periphery recognition support system 100 can be reduced.

The periphery recognition support unit 20 may be attachable to and detachable from the PWC as an accessory component. With this, even when the periphery recognition support unit 20 malfunctions, the periphery recognition support unit 20 can be easily repaired or replaced. Since the periphery recognition support unit 20 is the accessory component, the watercraft body structure can be made common between when the periphery recognition support system 100 is not required and when it is required.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

As above, the embodiments have been described as examples of the technology disclosed in the present application. However, the technology in the present disclosure is not limited to those and is also applicable to embodiments in which modifications, replacements, additions, omissions and the like are suitably made. Moreover, a new embodiment may be prepared by combining the components described in the above embodiments. For example, some of components or methods in an embodiment may be applied to another embodiment, and some of components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A periphery recognition support system for a personal watercraft,
the periphery recognition support system comprising processing circuitry configured to:
receive position related data related to a positional relation between a personal watercraft and a peripheral object around the personal watercraft;
determine whether a type of the peripheral object is a human floating on or in water or the type of the peripheral object is a non-human;
determine whether or not the position related data satisfies a warning condition that varies depending on whether or not the type of the peripheral object is the human, the warning condition when the type of the peripheral object is the human being different from the warning condition when the type of the peripheral object is the non-human; and
based on the determination of whether the type of the peripheral object is the human:
output a warning signal indicating that the type of the peripheral object is the human, in response to determining that the warning condition is satisfied; or
output a warning signal indicating that the type of the peripheral object is not the human, in response to determining that the warning condition when the type of the peripheral object is the non-human is satisfied.

2. The periphery recognition support system according to claim 1, wherein
the position related data includes an object distance correlated to a distance from the personal watercraft to the peripheral object;

the warning condition includes a condition that the object distance is less than a predetermined threshold; and the threshold changes in accordance with a speed of the personal watercraft.

3. The periphery recognition support system according to claim 1, wherein the peripheral object includes a predetermined regulated area.

4. The periphery recognition support system according to claim 1, wherein the warning signal includes an instruction of suppressing an output of a prime mover of the personal watercraft.

5. The periphery recognition support system according to claim 1, wherein:

the personal watercraft is an own personal watercraft;

the processing circuitry is further configured to receive a user's input of an instruction of registering at least one other personal watercraft as specific personal watercrafts; and outputting the warning signal includes:

transmitting the warning signal to the own personal watercraft, and transmitting the warning signal to the specific personal watercraft.

6. The periphery recognition support system according to claim 1, further comprising a sensor that is at the personal watercraft and detects a position of the peripheral object, wherein receiving the position related data includes receiving a detection signal of the sensor.

7. The periphery recognition support system according to claim 1, wherein:

the personal watercraft includes an own position sensor that acquires own position data indicating own position coordinates and a transceiver that receives a wireless signal including object position data indicating object position coordinates of the peripheral object, the wireless signal being transmitted from a wireless transmitter located at the peripheral object; and the processing circuitry is further configured to generate the position related data based on the own position data acquired by the own position sensor and the object position data of the wireless signal received by the transceiver and make a user interface display the generated position related data.

8. The periphery recognition support system according to claim 7, wherein the processing circuitry is further configured to make the user interface display warning information when it is determined that the warning condition is satisfied.

9. The periphery recognition support system according to claim 1, wherein:

the personal watercraft includes a sonar that outputs a sound wave toward a water bottom and receives a reflected wave that is the sound wave reflected by the water bottom; and the processing circuitry is further configured to generate a positional relation between the personal watercraft and the water bottom as the position related data based on the reflected wave received by the sonar.

10. The periphery recognition support system according to claim 1, wherein when the peripheral object is a movable object, the warning condition is set so as to be more easily satisfied than when the peripheral object is a fixed object.

11. The periphery recognition support system according to claim 1, wherein:

the position related data includes an object distance correlated to a distance from the personal watercraft to the peripheral object;

the warning condition includes a condition that the peripheral object exists in a warning region based on the personal watercraft; and the warning region set in a traveling state of the personal watercraft is different from the warning region set in an idling state of the personal watercraft.

12. The periphery recognition support system according to claim 1, wherein the processing circuitry is further configured to receive a user's input of an instruction of registering at least one other personal watercraft as the peripheral object.

13. The periphery recognition support system according to claim 1, wherein:

the personal watercraft is an own personal watercraft; and outputting the warning signal includes:

transmitting the warning signal to the own personal watercraft, and transmitting the warning signal to at least one other personal watercraft.

14. The periphery recognition support system according to claim 1, wherein the warning condition is changed in accordance with an ambient environment of the personal watercraft.

15. The periphery recognition support system according to claim 1, wherein:

the processing circuitry is comprised by a periphery recognition support unit;

the periphery recognition support unit is arranged in front of a handle of the personal watercraft and above an upper surface of a seat of the personal watercraft.

16. The periphery recognition support system according to claim 1, wherein the processing circuitry is further configured to:

receive the position related data, the position related data indicating the positional relation between the personal watercraft and the peripheral object around the personal watercraft;

determine whether or not the position related data satisfies the predetermined warning condition;

output the warning signal when the warning condition is satisfied; and receive a user's input of an instruction of registering at least one other personal watercraft as the peripheral object.

17. The periphery recognition support system according to claim 1, wherein:

the position related data includes an object distance correlated to a distance from the personal watercraft to the peripheral object;

the warning condition includes a condition that the object distance is less than a predetermined threshold; and the predetermined threshold is set to differ depending on whether the type of the peripheral object is the human or the type of the peripheral object is the non-human.

18. A periphery recognition support system for a personal watercraft, the periphery recognition support system comprising processing circuitry configured to:

receive position related data related to a positional relation between a personal watercraft and a peripheral object around the personal watercraft;

determine whether or not the position related data satisfies a predetermined warning condition; and output a predetermined warning signal when it is determined that the warning condition is satisfied, wherein:

the peripheral object includes a virtual outer edge of a travelable area; and the processing circuitry is further configured to
receive remaining amount data indicating a remaining amount of an energy source of the personal watercraft and
determine the virtual outer edge of the travelable area based on the remaining amount data.

19. A periphery recognition support method for a personal watercraft, the periphery recognition support method comprising:

receiving position related data via processing circuitry, the position related data indicating a positional relation between a personal watercraft and a peripheral object around the personal watercraft;

via the processing circuitry, determining whether a type of the peripheral object is a human floating on or in water or the type of the peripheral object is a non-human;

via the processing circuitry, determining whether or not the position related data satisfies a warning condition that varies depending on whether or not the type of the peripheral object is the human, the warning condition when the type of the peripheral object is the human being different from the warning condition when the type of the peripheral object is the non-human; and via the processing circuitry, based on the determination of whether the type of the peripheral object is the human:

making a user interface output a warning signal indicating that the type of the peripheral object is the human, and further indicating a position of the human based on the position related data, in response to determining that the warning condition when the type of the peripheral object is the human is satisfied; or making the user interface output a warning signal indicating that the type of the peripheral object is not the human, and further indicating a position of the non-human based on the position related data, in response to determining that the warning condition when the type of the peripheral object is the non-human is satisfied.

* * * * *